(12) United States Patent
Kohama et al.

(10) Patent No.: US 9,523,001 B2
(45) Date of Patent: Dec. 20, 2016

(54) SILICONE RUBBER COMPOSITION

(71) Applicant: Terumo Kabushiki Kaisha, Tokyo (JP)

(72) Inventors: Hiromasa Kohama, Kanagawa (JP); Makoto Onishi, Shizuoka (JP); Yuki Souma, Shizuoka (JP)

(73) Assignee: TERUMO KABUSHIKI KAISHA (JP)

( * ) Notice: Subject to any disclaimer, the term of this patent is extended or adjusted under 35 U.S.C. 154(b) by 749 days.

(21) Appl. No.: 13/801,168

(22) Filed: Mar. 13, 2013

(65) Prior Publication Data

US 2013/0192167 A1    Aug. 1, 2013

Related U.S. Application Data

(63) Continuation of application No. PCT/JP2011/064470, filed on Jun. 23, 2011.

(30) Foreign Application Priority Data

Sep. 17, 2010 (JP) ................................. 2010-209659
Sep. 17, 2010 (JP) ................................. 2010-209675

(51) Int. Cl.
| | |
|---|---|
| C08L 83/04 | (2006.01) |
| C08J 3/24 | (2006.01) |
| C08K 5/13 | (2006.01) |
| B65B 5/04 | (2006.01) |
| C08G 77/12 | (2006.01) |
| C08G 77/20 | (2006.01) |

(52) U.S. Cl.
CPC .................. *C08L 83/04* (2013.01); *B65B 5/04* (2013.01); *C08J 3/24* (2013.01); *C08K 5/13* (2013.01); *C08G 77/12* (2013.01); *C08G 77/20* (2013.01); *C08J 2383/04* (2013.01)

(58) Field of Classification Search
None
See application file for complete search history.

(56) References Cited

U.S. PATENT DOCUMENTS

| | | | | |
|---|---|---|---|---|
| 5,543,457 | A * | 8/1996 | Lewis | C08K 5/13 428/321.5 |
| 5,696,192 | A | 12/1997 | Harashima | |
| 5,959,025 | A | 9/1999 | Lewis et al. | |
| 6,102,898 | A | 8/2000 | Khan et al. | |
| 6,168,782 | B1 | 1/2001 | Lin | |
| 6,423,417 | B1 * | 7/2002 | Robbins | B05D 3/0209 106/287.12 |
| 2005/0213926 | A1 | 9/2005 | Tabei et al. | |
| 2005/0232964 | A1 * | 10/2005 | Fennimore | A61F 2/954 424/423 |
| 2006/0282414 | A1 | 12/2006 | Sugihara et al. | |
| 2007/0198080 | A1 * | 8/2007 | Ding | A61L 31/10 623/1.38 |
| 2007/0202245 | A1 * | 8/2007 | Gantner | A61L 15/58 427/2.1 |
| 2010/0172849 | A1 | 7/2010 | Shaow | |

FOREIGN PATENT DOCUMENTS

| | | | |
|---|---|---|---|
| CN | 101104700 A | 1/2008 | |
| CN | 101395206 B | 3/2013 | |
| DE | 1995144466 A1 | 6/1996 | |
| EP | 0 775 717 A2 | 5/1997 | |
| EP | 1 057 872 A1 | 12/2000 | |
| FR | WO 2008057155 A1 * | 5/2008 | ............ C09J 183/04 |
| JP | H02-000949 B2 | 1/1990 | |
| JP | H08-066461 A | 3/1996 | |
| JP | H08-259817 A | 10/1996 | |
| JP | H09-001697 A | 1/1997 | |
| JP | 2005-272697 A | 10/2005 | |
| JP | 2005-344102 A | 12/2005 | |
| JP | 2006-063208 A | 3/2006 | |
| JP | 2006-344102 A | 12/2006 | |
| JP | 2009-114376 A | 5/2009 | |

OTHER PUBLICATIONS

Office Action dated Mar. 5, 2015 for Japanese Patent Application No. 2012-533897.
Office Action dated Jan. 12, 2015 for Chinese Patent Application No. 201180044297.6 and English translation of the same (10 pages).
Supplementary European Search Report and European Search Opinion issued in corresponding European Application No. 11 82 4856, dated Feb. 25, 2014 (5 pages).
International Search Report from the International Bureau of WIPO for International Application No. PCT/JP2011/064470 dated Oct. 18, 2011 and English translation of the same (4 pages).
Chinese Office Action dated May 21, 2014, issued in the corresponding Chinese patent application No. 201180044297.6 and English translation of the same. (6 pages).

* cited by examiner

*Primary Examiner* — Robert S Loewe
(74) *Attorney, Agent, or Firm* — Fitch Even Tabin & Flannery LLP

(57) ABSTRACT

A means for restraining hardening of silicone rubber is provided. In one form, a silicone rubber composition is provided that contains an antioxidant dispersed therein. In addition, a method for preparing the silicone rubber composition is provided that includes: a step of mixing a silicone rubber precursor and the antioxidant and curing the obtained mixture; or a step of wetting the silicone rubber with a liquid antioxidant. A method of manufacturing a medical device is also provided, including: a step of incorporating into a medical device the silicone rubber composition obtained in the preparation method outlined above; a step of seal packaging the obtained medical device; and a step of irradiating the seal-packaged medical device with radiation.

14 Claims, No Drawings

SILICONE RUBBER COMPOSITION

CROSS-REFERENCE TO RELATED APPLICATIONS

This application is a continuation of PCT/JP2011/064470 filed on Jun. 23, 2011, which claims priority from Japanese Patent Application JP 2010-209675, filed Sep. 17, 2010, and Japanese Patent Application JP 2010-209659, filed Sep. 17, 2010, which are hereby incorporated by reference in their entirety.

FIELD OF THE INVENTION

The present invention relates to a silicone rubber composition. More particularly, the present invention relates to a silicone rubber composition which can be suitably used for a medical device to be sterilized with radiation.

BACKGROUND OF THE INVENTION

Silicone rubbers are widely used as elastic material or fiber material in medical devices.

For instance, Patent Document 1: Japanese Patent Publication No. Hei 2-949 discloses a medical tube introducing device (introducer) used when introducing a medical elongate member, such as a catheter or a guide wire, into a living organism. The introducer has a tubular main body, a cap disposed at one end of the main body, and a valve body located on a path in the tube of the main body and fixed in the state of being clamped between the main body and the cap.

The valve body has a slit in a central portion thereof. The slit is opened when a catheter or the like is inserted in the main body, and the slit is closed when the catheter or the like is pulled out of the main body, to keep blood from flowing out of the introducer. Thus, the valve body must be elastically opened and closed as a consequence of insertion into and withdrawal of the catheter from the introducer. Such a valve body is formed of an elastic material which is pliable and has appropriate strength. As the elastic material, silicone rubbers are widely used because of, for example, their low toxicity to living organisms.

SUMMARY OF THE INVENTION

The medical devices as above-mentioned must be subjected, before use, to a sterilizing treatment by which microorganisms present on the surfaces or in the inside of the medical devices are killed or removed. Examples of the method for sterilization include radiation sterilization such as γ-ray sterilization and electron beam sterilization, etc., ethylene oxide gas sterilization, and high-pressure steam sterilization (autoclave sterilization). Among these methods, the radiation sterilization method is preferable, since the treatment time is short, a continuous treatment can be performed, and there is no need for any after-treatment.

If a medical device having a silicone rubber or silicone rubber material is subjected to radiation sterilization, however, the silicone rubber would be hardened by irradiation. Thus, radiation can have a negative impact on the desired elasticity of the medial device.

Accordingly, it is an object of the present invention to provide means for restraining or limiting the hardening of silicone rubber.

In order to solve the above-mentioned problem, the present inventors have undertaken extensive and intensive research. In the process of their research, the inventors found out that hardening of silicone rubber can be effectively restrained or limited by the addition of an antioxidant to the silicone rubber. Based on the finding, the present invention has been developed.

Specifically, according to the present invention, there is provided a silicone rubber composition containing an antioxidant dispersed in at least a part of a silicone rubber.

Additionally, according to the present invention, there is provided a method of preparing a silicone rubber composition, including: a step of mixing a silicone rubber precursor with an antioxidant and curing the obtained mixture; or a step of wetting a silicone rubber with a liquid antioxidant.

Further, according to the present invention, there is provided a method of manufacturing a medical device, including a step of incorporating the silicone rubber obtained by the above-mentioned preparation method into a medical device, a step of seal packaging the obtained medical device, and irradiating the seal-packaged medical device with radiation.

According to the present invention, hardening of silicone rubber can be restrained or limited.

In one form, a silicone rubber composition suitable for a medical device to be sterilized with radiation is provided. The silicone rubber composition includes a crosslinked polysiloxane silicone rubber, an antioxidant, and polydimethylsiloxane, the antioxidant and polydimethylsiloxane being in amounts effective to restrain crosslinking of radicals generated during radiation sterilization.

The silicone rubber composition of the above form can include the polydimethylsiloxane at 1 to 30 weight percent of the silicone rubber composition.

The silicone rubber composition of the above form can have the antioxidant include tert-butylhydroxyanisole selected from the group consisting of 2-tert-butyl-4-hydroxyanisole, 3-tert-butyl-4-hydroxyanisole, 2,6-di-tert-butyl-4-hydroxyanisole, 3,5-di-tert-butyl-4-hydroxyanisole, and mixtures thereof.

The silicone rubber composition of the above form can have the antioxidant as vitamin E or its derivates or a salt of vitamin E or its derivative.

The silicone rubber composition of the above form can have 0.1 to 10 percent of the antioxidant and about 1 to about 30 percent of the polydimethylsiloxane.

The silicone rubber composition of the above form can have the crosslinked polysiloxane silicone rubber as an alkenyl group-containing polyorganosiloxane crosslinked to an organohydrogenpolysiloxane.

In a preferred form, the alkenyl group-containing polyorganosiloxane includes 0.001 to 1 mole percent of the alkenyl group based on 1 mole of the polyorganosiloxane.

In another preferred form, the organohydrogenpolysiloxane has at least two hydrogen atoms bonded to a silicon atom and contains 0.5 to 3 moles of silicon-bonded hydrogen per 1 mole of the alkenyl group in the alkenyl group-containing polyorganosiloxane.

The silicone rubber composition of the above form can be incorporated in a medical device.

In another aspect, a method of preparing a silicone rubber article is provided and includes combining an antioxidant and polydimethylsiloxane with a silicone rubber precursor to form an intermediate composition, wherein the polydimethylsiloxane is added to the silicone rubber precursor prior to or simultaneously with the antioxidant, mixing the intermediate composition of the antioxidant, the polydimethylsiloxane, and the silicone rubber precursor to form a mixed intermediate composition, and subjecting the mixed intermediate composition to one of a curing and a forming process, or both.

In the above method, 0.1 to 10 percent of the antioxidant and 1 to 30 percent of the polydimethylsiloxane can be combined with the silicone rubber precursor to form the intermediate composition.

In the above method, the antioxidant can be selected from the group consisting of tert-butylhydroxyanisole, vitamin E or its derivates, and a salt of vitamin E or its derivative.

In another aspect, a method of preparing a silicone rubber composition is providing including forming a crosslinked silicone rubber composition, and contacting a surface of the crosslinked silicone rubber composition with a liquid antioxidant and a liquid polydimethylsiloxane for a predetermined time and at a predetermined temperature so that the antioxidant and the polydimethylsiloxane are introduced into the crosslinked silicone rubber composition.

In the above method, the surface of the crosslinked silicone rubber composition can be wetted with amounts of the liquid antioxidant and the liquid polydimethylsiloxane so that the crosslinked silicone rubber composition includes 0.1 to 10 percent of the antioxidant and 1 to 30 percent of the polydimethylsiloxane.

In the above method, the liquid antioxidant in the crosslinked silicone rubber composition can include tert-butylhydroxyanisole selected from the group consisting of 2-tert-butyl-4-hydroxyanisole, 3-tert-butyl-4-hydroxyanisole, 2,6-di-tert-butyl-4-hydroxyanisole, 3,5-di-tert-butyl-4-hydroxyanisole, and mixtures thereof.

In the above method, the liquid antioxidant in the crosslinked silicone rubber composition can include vitamin E or its derivates or a salt of vitamin E or its derivative.

In yet another aspect, a method of forming a medical device is provided including mixing a silicone rubber precursor with an antioxidant and curing the mixture to form a silicone rubber composition, or wetting a silicone rubber with a liquid antioxidant to form a silicone rubber composition, incorporating the obtained silicone rubber composition into a medical device, seal packaging the medical device, and irradiating the seal-packaged medical device with radiation.

In the above method, the mixing or wetting can include polydimethylsiloxane.

In the above method, the medical device can include a catheter, tube, or introducer.

In the above method, the silicone rubber composition can be formed into a valve body having a slit that does not adhere closed upon being irradiated.

DETAILED DESCRIPTION OF THE PREFERRED EMBODIMENTS

Now, a preferred mode of the present invention will be described below.

<Silicone Rubber Composition>

The silicone rubber composition according to the present mode is characterized in that an antioxidant is dispersed in at least a part of a silicone rubber.

Conventional silicone rubbers had a drawback that when they are irradiated with radiation such as γ-rays or electron beams, hardening of the silicone rubber would occur, whereby elasticity (flexibility) of the silicone rubber would be lost. This is considered to be attributable to the following mechanism. When a silicone rubber material is irradiated with radiation, radicals are generated through cleavage of siloxane bonds, pulling-out of substituent groups bonded to a silicon atom, pulling-out of hydrogen atoms present on the substituent groups bonded to the silicon atom, or the like. The radicals thus generated are bonded to each other, whereby intramolecular crosslinking or intermolecular crosslinking is induced, and the motions of molecules are restricted, resulting in a hardening of the silicone rubber.

The present inventors searched for means for restraining or limiting such hardening of silicone rubber. As a result of the search, it was found out that a remarkable hardening-restraining effect can be obtained by addition of an antioxidant to a silicone rubber material. It was also found out that changes in physical properties of the silicone rubber material due to the addition thereto of the antioxidant are slight. Based on these findings, the present invention has been completed. The antioxidant is considered to function as a radical-trapping agent in the silicone rubber, thereby restraining or limiting hardening of the silicone rubber.

Now, components of the silicone rubber composition according to the present mode will be described below.

[Silicone Rubber]

The silicone rubber in the present mode is not specifically restricted so long as it is a polysiloxane which has a crosslinked structure and has rubber-like properties. Normally, a silicone rubber is prepared by crosslinking a polysiloxane, which is a silicone rubber precursor.

The silicone rubber in the present mode is preferably a silicone rubber obtained by crosslinking a silicone rubber precursor which includes an alkenyl group-containing polyorganosiloxane (A) and an organohydrogenpolysiloxane (B). Incidentally, in the following description, the alkenyl group-containing polyorganosiloxane (A) will be referred to also as "polysiloxane (A)," and the organohydrogenpolysiloxane (B) will be referred to also as "polysiloxane (B)."

The above-mentioned alkenyl group-containing polyorganosiloxane (A) means a polysiloxane having an alkenyl group bonded to a silicon atom. The content of the alkenyl groups is not particularly limited, and is preferably not less than 0.005 mol %, more preferably 0.001 to 1 mol %, based on 1 mole of the polysiloxane (A) molecules.

Examples of the alkenyl group include vinyl group, allyl group, propenyl group, methallyl group, butenyl group, and hexenyl group. Among these alkenyl groups, preferred is the vinyl group.

The polysiloxane (A) may have other substituent group or groups (organo group or groups) than the alkenyl group(s). Examples of the other substituent group(s) include substituted or unsubstituted alkyl groups of 1 to 8 carbon atoms, substituted or unsubstituted alkoxy groups of 1 to 8 carbon atoms, substituted or unsubstituted aryl groups, and substituted or unsubstituted aralkyl groups.

Specific examples of the alkyl groups of 1 to 8 carbon atoms include methyl, ethyl, n-propyl, isopropyl, n-butyl, isobutyl, sec-butyl, tert-butyl, hexyl, and octyl groups. Among these alkyl groups, preferred is the methyl group.

Examples of the alkoxy groups of 1 to 8 carbon atoms include methoxy, ethoxy, n-propoxy, isopropoxy, n-butoxy, isobutoxy, sec-butoxy, tert-butoxy, hexyloxy, and octyloxy groups. Examples of the aryl groups include phenyl, and methylphenyl groups. Examples of the aralkyl groups include benzyl, phenethyl, and diphenylmethyl groups.

In addition, examples of a group which can be substituted by the alkenyl group, alkyl group, alkoxy group, aryl group, or aralkyl group include halogen atoms, acyl groups, alkyl groups, phenyl group, alkoxyl groups, amino group, alkylamino groups, carbonyl group, and cyano group.

Incidentally, the polysiloxane (A) is in any one of a straight chain form, a branched chain form, and a cyclic form, or combinations of two or more of these forms.

The above-mentioned organohydrogenpolysiloxane (B) is a polysiloxane which has at least two hydrogen atoms bonded to a silicon atom. The two hydrogen atoms are added to the double bond of the alkenyl group in the polyorganosiloxane (A), so as to form a crosslinked structure.

Additionally, the polysiloxane (B) may have other substituent group or groups (organo group or groups) besides the hydrogen atoms. Examples of the substituent group(s) include the same groups as those mentioned above as examples of the substituent group(s) in the polysiloxane (A). Incidentally, the polysiloxane (B) may be in any one of a straight chain structure, a branched chain structure, and a cyclic structure, or combinations of two or more of these structures.

The proportions of the polysiloxane (A) and the polysiloxane (B) used in preparation of the silicone rubber are not particularly limited. Preferably, the polysiloxanes (A) and (B) are used in such proportions so that the amount of the silicon-bonded hydrogen atoms contained in the polysiloxane (B) is 0.5 to 3.0 moles per 1 mole of the alkenyl groups contained in the polysiloxane (B).

Incidentally, the silicone rubber in this mode may further contain a catalyst for crosslinking of the polysiloxanes present as silicone rubber precursor. The catalyst is not specifically restricted, and is preferably a platinum-based catalyst. Specific examples of the catalyst include platinum black, silica-supported platinum, carbon-supported platinum, chloroplatinic acid, alcohol solutions of chloroplatinic acid, platinum/olefin complexes, platinum/alkenylsiloxane complexes, platinum/β-diketone complexes, and platinum/phosphine complexes. The catalyst may be added in an amount of about 0.1 to 500 ppm (as Pt) based on the total amount of the silicone rubber precursors.

Further, the silicone rubber in this mode may contain, in addition to the above-mentioned components, an inorganic filler for controlling hardness, for enhancing thermal resistance, or for increasing volume. As the inorganic filler, there are a variety which are ordinarily used for silicone rubbers that can be used. Examples of the inorganic filler include fumed silica, precipitated silica, particulate silicas obtained by surface treatment of these silicas, and, further, powders of diatomaceous earth, quartz, and clay.

[Antioxidant]

The antioxidant, in the silicone rubber composition according to this mode, functions as a radical-trapping agent for restraining a crosslinking reaction.

The antioxidant for use in this mode is not specifically restricted, and those antioxidants which can be used as food additives are preferably used. Specific examples of the antioxidant used here include tert-butylhydroxyanisole (hereinafter referred also to simply as "BHA"), and vitamin E or its derivative or a salt of vitamin E or its derivative (hereinafter referred also to simply as "vitamin E or the like" or "vitamin E and the like").

The term "tert-butylhydroxyanisole" used herein is a concept which includes: mono-substituted tert-butylhydroxyanisoles in which 4-hydroxyanisole has been substituted by one tert-butyl group, such as 2-tert-butyl-4-hydroxyanisole (2BHA) and 3-tert-butyl-4-hydroxyanisole (3BHA); and di-substituted tert-butylhydroxyanisoles in which 4-hydroxyanisole has been substituted by two tert-butyl groups, such as 2,6-di-tert-butyl-4-hydroxyanisole (2,6-DBHA) and 3,5-di-tert-butyl-4-hydroxyanisole (3,5-DBHA). In the silicone rubber composition in this mode, any of these tert-butylhydroxyanisoles can be used. Among these tert-butylhydroxyanisoles, 3-tert-butyl-4-hydroxyanisole is preferably used, which shows a high hardening-restraining effect.

Examples of the vitamin E include α-tocopherol, β-tocopherol, γ-tocopherol, δ-tocopherol, α-tocotrienol, β-tocotrienol, γ-tocotrienol, and δ-tocotrienol. These may each be either an optically active body or a racemic body. Besides, other than these tocopherols and tocotrienols, their analogues (chromane ring compounds, etc.) having an oxidation-preventive effect (anti-oxidation effect) can also be used as the vitamin E in this mode.

Examples of the derivative of vitamin E include acetic acid ester of vitamin E, nicotinic acid ester of vitamin E, linoleic acid ester of vitamin E, and succinic acid ester of vitamin E.

The salt of vitamin E or its derivative is not specifically restricted so long as it is a physiologically permissible salt. Examples of the salt of vitamin E or its derivative which can be suitably used include salts of alkali metals such as sodium, potassium, etc., salts of alkaline earth metals such as calcium, magnesium, etc., salts of organic amines such as triethanolamine, triethylamine, etc., ammonium salts, and basic salts of amino acids such as alginine, lysine, etc. Incidentally, the vitamin E and the like may be used either singly or in combination of two or more of the above examples.

Among the vitamin E and the like, α-tocopherol or α-tocopherol acetate is preferably used, and α-tocopherol is more preferably used, from the viewpoint of the oxidation preventive effect.

Incidentally, the above-mentioned antioxidants may be used either singly or in combination of two or more of the above examples.

The content of the antioxidant contained in the silicone rubber composition according to the present mode is not particularly limited insofar as it is within such a range as not to markedly lower the performance of the silicone rubber composition. From the viewpoint of the hardening-restraining effect, the lower limit of the content is preferably not less than 0.1 wt. %, more preferably not less than 0.125 wt. %, and further preferably not less than 0.5 wt. %, based on the whole weight of the silicone rubber. Besides, from the viewpoint of maintaining physical properties of the silicone rubber composition, the upper limit of the content is not more than 10.0 wt. %, more preferably not more than 5.0 wt. %, based on the whole weight of the silicone rubber.

The silicone rubber in the present mode contains the antioxidant dispersed in at least a part of the silicone rubber. The form of dispersion is not specifically restricted. Thus, the antioxidant may be localized in a part of the silicone rubber (for example, localized in a surface portion of the silicone rubber), or may be substantially uniformly dispersed throughout the silicone rubber. For enhancing the hardening-restraining effect on the silicone rubber composition, the antioxidant is preferably dispersed substantially uniformly (more preferably, uniformly) throughout the silicone rubber.

[Polydimethylsiloxane]

The silicone rubber composition according to the present mode may further contain a polydimethylsiloxane (PDMS) (silicone oil), in addition to the above-mentioned antioxidant. Specifically, the silicone rubber composition according to a preferred mode for carrying out the present invention further contains a polydimethylsiloxane in at least a part of the silicone rubber. Particularly where the antioxidant is vitamin E or its derivative or a salt of vitamin E or its derivative, preferably, the PDMS is further dispersed in at least a part of the silicone rubber. The PDMS functions to restrain hardening of the silicone rubber more effectively and to control the viscosity of the silicone rubber. Incidentally, the PDMS differs from the silicone rubber in that it has an uncrosslinked straight chain structure and is soluble in organic solvents such as toluene.

The hardening-restraining effect exhibited by the PDMS is considered to be attributable to the following mechanism. When the PDMS is irradiated with radiation, radicals are generated through cleavage of siloxane bonds in the PDMS, pulling-out of methyl groups from the PDMS, puling-out of hydrogen atoms present on methyl groups in the PDMS, or the like, like in the case of the silicone rubber. Then, the radicals thus generated are bonded to one another, resulting in intramolecular crosslinking or intermolecular crosslinking. Where the silicone rubber composition contains PDMS, the PDMS competitively hinders the radical generation and/or crosslinking reaction in the silicone rubber, whereby hardening of the silicone rubber is restrained or limited. Incidentally, since the PDMS intrinsically does not have a crosslinked structure such as that of the silicone rubber, even if radical generation and/or crosslinking reaction occurs in the PDMS, it does not produce a considerable influence on the hardness of the silicone rubber composition.

The viscosity (25° C.) of the PDMS is preferably 10 to 12500 $mm^2/s$, more preferably 20 to 1000 $mm^2/s$. When PDMS having a viscosity in such a range is used, hardening of the silicone rubber can be restrained or limited effectively. Incidentally, as the viscosity herein, a viscosity value measured by a method according to ASTM D2515 is adopted.

The content of the PDMS in the silicone rubber composition in the present mode can be appropriately adjusted according to the hardness of the silicone rubber used. From the viewpoint of the hardening-restraining effect, the lower limit of the content is preferably not less than 1.0 wt. and more preferably not less than 5.0 wt. %, based on the whole weight of the silicone rubber. Besides, from the viewpoint of maintaining physical properties of the silicone rubber composition, the upper limit of the content is preferably not more than 30.0 wt. %, and more preferably not more than 25.0 wt. %, based on the whole weight of the silicone rubber.

Other than the silicone rubber, the antioxidant and the PDMS, the silicone rubber composition in this mode may, if necessary, contain various additives in such ranges as not to considerably spoil the effect of the present invention.

Examples of the additives include crosslinking agent, filler, UV absorber, plasticizer, colorant, antistatic agent, thermal stabilizer, anti-oxidizing agent, light stabilizer, flame retardant, lubricant, antioxidant, age resistor, reaction aid, reaction inhibitor, and resin.

While the silicone rubber composition in the present mode has been described above, also in the case where the above-mentioned antioxidant is dispersed in other rubber material easily curable by irradiation with radiation, the hardening of the other rubber material can be restrained or limited. Examples of the other rubber material include natural rubber, fluoro-rubber, butadiene rubber, butyl rubber, ethylene-propylene rubber, and acrylic rubber.

<Method of Preparing Silicone Rubber Composition>

The silicone rubber composition in the present mode can be prepared by: (I) mixing a silicone rubber precursor and an antioxidant and curing the obtained mixture; or (II) wetting a silicone rubber with a liquid antioxidant.

In the above method (I), first, predetermined amounts of an uncrosslinked silicone rubber precursor, an antioxidant (for example, BHA or vitamin E or the like), and optional additives and the like are measured, and are mixed by a mixer or the like so that the components are uniformly dispersed. Examples of the mixer to be used here include mixing rolls, pressure kneaders, roller mills, Banbury mixer, two-roll mills, three-roll mills, homogenizers, ball mills, and bead mills. The temperature for mixing is not particularly limited, but it is preferable to carry out the mixing at 0 to 100° C. in the case where BHA is used as the antioxidant. Where vitamin E or the like is used as the antioxidant, the mixing is preferably carried out at 0 to 50° C. Such a temperature ensures easier mixing. While the mixing may be conducted in air (in the presence of oxygen), it may, if necessary, be carried out in an atmosphere of an inert gas, such as nitrogen, for preventing the antioxidant from being oxidized. Then, the obtained mixture is further subjected, as required, to a forming step and/or a curing step, to be a silicone rubber composition having a desired shape and desired physical properties (for example, elasticity). Incidentally, the apparatuses and conditions and the like used in the forming step and the curing step are not specifically restricted, and the know-how in the art can be adopted appropriately. The present method is advantageous in that it is easy to control the amount of the antioxidant contained in the silicone rubber composition.

In the above method (II), on the other hand, a crosslinked silicone rubber is wetted with a liquid antioxidant (for example, BHA or vitamin E or the like) to introduce the antioxidant into the inside of the silicone rubber. The term "liquid antioxidant" used herein means an antioxidant melted at a temperature that is not lower than its melting point. One example of the liquid antioxidant is α-tocopherol, which is a kind of vitamin E. Since α-tocopherol has a melting point of 2.5 to 3.5° C. and a boiling point of 200 to 220° C., it is liquid at normal temperature. The silicone rubber to be used in the present method is preferably a silicone rubber obtained by preliminarily admixing a silicone rubber precursor(s) with required additives, forming the admixture, and curing the formed product. In other words, the present method ensures that introduction of the antioxidant can be carried out while a silicone rubber member with a desired shape and desired physical properties which has been conventionally used is used as it is; in this point, the method (II) is advantageous over the above-mentioned method (I). Then, the silicone rubber is wetted with the liquid antioxidant. At the time of the wetting, it is preferable that the silicone rubber is wholly in contact with the antioxidant. In addition, the wetting temperature and wetting time are adjusted according to the size and shape of the silicone rubber. In the case where BHA is used as the antioxidant, the wetting is conducted at a temperature not lower than the melting point of BHA and not higher than 100° C. for one to 500 hours, whereby BHA can be effectively introduced into the silicone rubber. Where vitamin E or the like is used as the antioxidant, on the other hand, the wetting is ordinarily conducted at a temperature of 0 to 150° C. for one to 500 hours, whereby vitamin E or the like can be effectively introduced into the silicone rubber. Raising the wetting temperature accelerates the introduction of the antioxidant. While the wetting may be carried out in air (in the presence of oxygen), it may, if necessary, be conducted in an atmosphere of an inert gas, such as nitrogen, for preventing the antioxidant from being oxidized.

In addition, the method of adding PDMS in the case where the silicone rubber composition contains the PDMS is not specifically restricted. However, the method is preferably (i) a method in which PDMS is added to and mixed with the silicone rubber precursor, or (ii) a method in which the silicone rubber is wetted with PDMS. More specifically, in the case of adopting (i) the method in which PDMS is added to and mixed with the silicone rubber precursor, the above-mentioned method (I) is so conducted that the PDMS is added to and mixed with the silicone rubber precursor before or after admixing the silicone rubber precursor with the antioxidant (for example, BHA or vitamin E), or simultaneously with the admixing with the antioxidant. On the other hand, the above-mentioned method (II) is so conducted that the PDMS is added to and mixed with the silicone rubber precursor yet to be formed, then forming and curing are conducted, and thereafter the formed and cured silicone, rubber is wetted with the antioxidant (for example, BHA or vitamin E). Besides, in the case of adopting (ii) the method in which the silicone rubber is wetted with PDMS, the above-mentioned method (I) is so conducted that the silicone rubber precursor and the antioxidant are mixed, and the mixture is formed and cured, followed by wetting the formed and cured silicone rubber with the PDMS. On the other hand, the above-mentioned method (II) is so performed that the silicone rubber is wetted with PDMS before or after wetting with the antioxidant, or simultaneously with wetting with the antioxidant.

<Medical Device>

Since the above-mentioned silicone rubber composition experiences very little hardening by irradiation with radiation, it can be suitably used as an elastic material for a medical device which is subjected to radiation sterilization. Accordingly, the medical device including the silicone rubber composition is also embraced with in the technical scope of the present invention.

Examples of the medical device include, but are not restricted to, catheters; tubes; introducers used for introducing an elongate body, such as a catheter or a guide wire, into a living organism; body fluid circuits for artificial hearts, blood circuits, artificial dialysis and the like; infusion circuits for infusion of a medicinal liquid into a living organism continuously for a certain period of time; needle-pierced plugs to be pierced by injection needles or the like; and caps of medicinal liquid bottles. In such medical devices, the silicone rubber composition is used, for example, as balloons of catheters; hemostatic valves of introducers; an elastic material for packings in body fluid circuits or infusion circuits; check valves in infusion circuits; and O-rings and connectors in various devices.

A medical device having a valve body (hemostatic valve) formed by use of the above-mentioned silicone rubber composition shows little variation in hardness before and after irradiation with electron beams, so that the performance of the valve body is maintained even upon electron-beam sterilization. For instance, in the case of a valve body including a silicone rubber composition and provided with a slit, the slit would ordinarily be adhered closed upon irradiation with electron beams. As a result, the resistance to piercing by a dilator inserted into the valve body and insertion resistance by a catheter would be raised. In the case of using the above-mentioned silicone rubber composition according to the present mode, on the other hand, adhesion of the slit is restrained, and the resistance to the medical device such as a dilator or a catheter is maintained in the same manner as in the case where ethylene oxide gas sterilization is conducted. Further, even in the case where electron-beam sterilization is carried out, the flexibility of the silicone rubber composition can be maintained. Also in this case, therefore, leakage of a liquid at the valve body can be restrained in the same manner as in the case of ethylene oxide gas sterilization.

Incidentally, the above-mentioned medical devices are manufactured by the same method as that in the related art, except that the silicone rubber composition according to the present invention is incorporated into a main body of the medical device.

<Sterilization Step>

According to the present invention, there is further provided a method of manufacturing a medical device that includes a step of sterilizing the medical device by irradiation with radiation. In a preferred mode, the medical device is seal packaged, and thereafter the seal-packaged medical device is irradiated with radiation. By such seal packaging, the sterilized state of the medical device can be maintained. Therefore, the medical device can be immediately put to use, without subjecting it to a sterilization step, in a medical care site.

The dose of radiation at the time of irradiation varies depending on the product to be irradiated, and is not particularly limited. The dose is 5 to 100 kGy, and preferably 10 to 60 kGy.

The kinds of the radiation which can be used for irradiation include electron beams, γ-rays, and X-rays. Among these different kinds of radiation, from the viewpoint of easy industrial production electron beams supplied by an electron accelerator and γ-rays from cobalt-60 are preferred, and electron beams is more preferable. The electron accelerator is preferably an electron accelerator of a medium to high energy with an acceleration voltage of not less than 1 MeV, for enabling irradiation therewith of the inside of a medical device or the like having a comparatively thick part.

The atmosphere in which to conduct irradiation with ionizing radiation is not specifically restricted, and the irradiation may be conducted in an atmosphere from which air has been removed, such as an inert gas atmosphere or vacuum. In addition, irradiation with ionizing radiation may be conducted after the medical device is seal packaged in a package of packaging material that is sealed. In that case, also, the inside of the packaging material may be filled with air or an inert gas or may be in a vacuum state. While the irradiation may be carried out at an arbitrary temperature, the irradiation temperature is typically room temperature (25° C.).

EXAMPLES

The advantageous effect of the present invention will be described using Examples and Comparative Examples below. It is to be noted here, however, that the technical scope of the present invention is not limited only to the following examples. Unless otherwise stated, all parts and percentages referred to in this disclosure are by weight.

Preparation of Silicone Rubber Composition Containing 3-tert-butyl-4-hydroxyanisole Example 1

Preparation A and Preparation B of a millable type silicone rubber (hardness A 35) (MED, produced by NuSil Technology LLC), each in an amount of 50 parts by weight, were preliminarily softened by kneading at room temperature (25° C., here and hereinafter). To 50 parts by weight of Preparation A, was added 1.0 part by weight (1.0 wt. % based on the whole weight of the silicone rubber (total weight of Preparation A and Preparation B)) of 3-tert-butyl-4-hydroxyanisole (hereinafter referred to also as "3BHA") (produced by Wako Pure Chemical Industries, Ltd.), and the admixture was blended at 65° C. Thereafter, the blended mixture was once cooled to room temperature, to which 50 parts by weight of Preparation B was added, and the resulting admixture was further blended.

The thus obtained mixture was formed into a sheet having a thickness of 2 mm, and the sheet is cured by heat treatment at 116° C. for 10 minutes, to prepare a silicone rubber composition.

Example 2

A silicone rubber composition was prepared by the same method as in Example 1, except that 3BHA was added in an amount of 2.0 parts by weight (2.0 wt. based on the whole weight of the silicone rubber).

Example 3

A silicone rubber composition was prepared by the same method as in Example 1, except that 3BHA was added in an amount of 3.0 parts by weight (3.0 wt. based on the whole weight of the silicone rubber).

Example 4

A silicone rubber composition was prepared by the same method as in Example 1, except that 3BHA was added in an amount of 4.0 parts by weight (4.0 wt. % based on the whole weight of the silicone rubber).

Example 5

First, a silicone rubber was prepared by the same method as in Example 1, except for omitting the addition of 3BHA. A silicone rubber piece thus obtained was placed in a glass vessel, then 3BHA was added thereto in such an amount as to sufficiently cover the rubber piece, and the glass vessel was capped. The glass vessel was left to stand in an oven at 65° C. for nine days, thereby wetting the rubber piece with 3BHA. Thereafter, the rubber piece was taken out, and the 3BHA adhering to the surface of the rubber piece was wiped off, to obtain a silicone rubber composition.

The weight of the rubber piece thus obtained was compared with the weight before the wetting, and the amount of 3BHA contained in the silicone rubber composition was calculated. The amount of 3BHA contained was 4.0 wt. % based on the whole weight of the silicone rubber.

Example 6

Preparation A and Preparation B of a millable type silicone rubber (hardness A 50) (MED, produced by NuSil Technology LLC), each in an amount of 50 parts by weight, were preliminarily softened by kneading at room temperature. To 50 parts of Preparation A were added 0.5 part by weight (0.5 wt. % based on the whole weight of the silicone rubber (total weight of Preparation A and Preparation B)) of 3BHA (produced by Wako Pure Chemical Industries, Ltd.) and 20.0 parts by weight (20.0 wt. % based on the whole weight of the silicone rubber (total weight of Preparation A and Preparation B)) of a polydimethylsiloxane (360 Medical Fluid, produced by Dow Corning Corporation; 100 cSt), and the resulting admixture was blended at 65° C. Thereafter, the blended mixture was once cooled to room temperature, to which 50 parts by weight of Preparation B was added, and the admixture was further blended.

The mixture thus obtained was formed into a sheet having a thickness of 2 mm, and the sheet was cured by heat treatment at 116° C. for 10 minutes, to prepare a silicone rubber composition.

Example 7

A silicone rubber composition was prepared by the same method as in Example 6, except that 3BHA was added in an amount of 1.0 part by weight (1.0 wt. % based on the whole weight of the silicone rubber).

Example 8

A silicone rubber composition was prepared by the same method as in Example 6, except that 3BHA was added in an amount of 2.0 parts by weight (2.0 wt. % based on the whole weight of the silicone rubber).

Example 9

A silicone rubber composition was prepared by the same method as in Example 6, except that 3BHA was added in an amount of 3.0 parts by weight (3.0 wt. % based on the whole weight of the silicone rubber).

Example 10

A silicone rubber composition was prepared by the same method as in Example 6, except that 3BHA was added in an amount of 4.0 parts by weight (4.0 wt. % based on the whole weight of the silicone rubber).

Comparative Example 1

A silicone rubber was prepared by the same method as in Example 1, except for omitting the addition of 3BHA.
<Sterilization Step>
The silicone rubber compositions were irradiated with 40 kGy of electron beams by use of a 10 MeV electron accelerator at room temperature.
<Evaluation of Performance>
[Hardness]
The silicone rubber compositions obtained in Examples 1 to 10 and Comparative Example 1 above were measured for hardness before the sterilization treatment and after the sterilization treatment (before the irradiation with electron beams and after the irradiation with electron beams), according to JIS K 6253. Incidentally, the measurement was carried out by use of an Asker rubber durometer Type A. The results are set forth in Table 1 below.

TABLE 1

| | 3 BHA (wt. %) | PDMS (wt. %) | Method of addition | Hardness (A) | | |
|---|---|---|---|---|---|---|
| | | | | Before irradiation | After irradiation | Difference |
| Example 1 | 1.0 | — | Mixing | 39 | 43 | +4 |
| Example 2 | 2.0 | — | | 38 | 42 | +4 |
| Example 3 | 3.0 | — | | 39 | 41 | +2 |
| Example 4 | 4.0 | — | | 40 | 41 | +1 |
| Example 5 | 4.0 | — | Wetting | 38 | 42 | +4 |
| Example 6 | 0.5 | 20.0 | Mixing | 34 | 37 | +3 |
| Example 7 | 1.0 | 20.0 | | 33 | 35 | +2 |
| Example 8 | 2.0 | 20.0 | | 33 | 34 | +1 |
| Example 9 | 3.0 | 20.0 | | 31 | 31 | +0 |
| Example 10 | 4.0 | 20.0 | | 39 | 38 | −1 |

TABLE 1-continued

| | 3 BHA (wt. %) | PDMS (wt. %) | Method of addition | Hardness (A) | | |
|---|---|---|---|---|---|---|
| | | | | Before irradiation | After irradiation | Difference |
| Comparative Example 1 | — | — | — | 41 | 46 | +5 |

According to Table 1, it is seen that the silicone rubber compositions obtained in Examples 1 to 4 by mixing a silicone rubber with 3BHA and the silicone rubber composition obtained in Example 5 by wetting a silicone rubber with 3BHA were restrained from hardening through irradiation with radiation, as compared with the silicone rubber obtained in Comparative Example 1 wherein addition of 3BHA was omitted. In addition, by the results of Examples 1 to 4, it was verified that the hardening-restraining effect was enhanced as the amount of 3BHA added was increased. Incidentally, the change in hardness by only the addition of 3BHA (the difference between the hardness (catalogue value) of the silicone rubber and the hardness of the silicone rubber composition before the irradiation with electron beams) was slight. Further, it was verified that the silicone rubber compositions obtained in Examples 6 to 10 by adding polydimethylsiloxane in addition to 3BHA show further effective restraining of hardening upon irradiation with electron beams, as compared with the silicone rubber compositions obtained in Examples 1 to 5.

Preparation of Silicone Rubber Composition Containing α-tocopherol

Example 11

Preparation A and Preparation B of a millable type silicone rubber (hardness A 50) (SILASTIC, produced by Dow Corning Corporation), each in an amount of 50 parts by weight, were preliminarily softened by kneading at room temperature (25° C., here and hereinafter). To 50 parts by weight of Preparation A, were added 1.0 part by weight (1.0 wt. % based on the whole weight of the silicone rubber (total weight of Preparation A and Preparation B)) of α-tocopherol (produced by Wako Pure Chemical Industries, Ltd.) and 20.0 parts by weight (20.0 wt. % based on the whole weight of the silicone rubber (total weight of Preparation A and Preparation B)) of a polydimethylsiloxane (360 Medical Fluid, produced by Dow Corning Corporation; 100 cSt), and the resulting admixture was blended at room temperature. Thereafter, 50 parts by weight of Preparation B was added to the blended mixture, and the resulting admixture was further blended.

The mixture thus obtained was formed into a sheet having a thickness of 2 mm, and was cured by heat treatment at 116° C. for 10 minutes, to prepare a silicone rubber composition.

Example 12

A silicone rubber composition was prepared by the same method as in Example 11, except that α-tocopherol was added in an amount of 2.0 parts by weight (2.0 wt. % based on the whole weight of the silicone rubber).

Example 13

A silicone rubber composition was prepared by the same method as in Example 11, except that α-tocopherol was added in an amount of 3.0 parts by weight (3.0 wt. % based on the whole weight of the silicone rubber).

Example 14

A silicone rubber composition was prepared by the same method as in Example 11, except that α-tocopherol was added in an amount of 4.0 parts by weight (4.0 wt. % based on the whole weight of the silicone rubber).

Comparative Example 2

A silicone rubber composition was prepared by the same method as in Example 11, except that addition of α-tocopherol was omitted (in other words, only PDMS was added).

Comparative Example 3

Preparation A and Preparation B of a millable type silicone rubber (hardness A 35) (SILASTIC, produced by Dow Corning Corporation), each in an amount of 50 parts by weight, were preliminarily softened by kneading at room temperature (25° C., here and hereafter). To 50 parts by weight of Preparation A, was added 3.0 parts by weight (3.0 wt. % based on the whole weight of the silicone rubber (total weight of Preparation A and Preparation B)) of α-tocopherol (produced by Wako Pure Chemical Industries, Ltd.), and the resulting admixture was blended at room temperature. Thereafter, 50 parts by weight of Preparation B was added to the blended mixture, and the resulting admixture was further blended (in other words, only α-tocopherol was added).

The blended mixture thus obtained was formed into a sheet having a thickness of 2 mm, and was cured by heat treatment at 116° C. for 10 minutes, to prepare a silicone rubber composition.

Comparative Example 4

A silicone rubber was prepared by the same method as in Comparative Example 3, except that addition of α-tocopherol was omitted (namely, neither α-tocopherol nor PDMS was added).

<Sterilization Treatment>

The silicone rubber compositions obtained as above were irradiated with 40 kGy of electron beams by use of a 10 MeV electron accelerator at room temperature.

<Evaluation of Performance>

[Hardness]

The silicone rubber compositions obtained in Examples 11 to 14 and Comparative Example 4 were measured for hardness before the sterilization treatment and after the sterilization treatment (before the irradiation with electron beams and after the irradiation with electron beams) according to JIS K 6253. Incidentally, the measurement was carried out by use of an Asker rubber durometer Type A. The results are set forth in Table 2 below.

[Tensile Modulus]

From the silicone rubber compositions obtained in Examples 11 to 14 and Comparative Example 4, 5B type dumbbell specimens specified in ISO 527-2 were prepared by use of a cutting die. The dumbbell specimens were subjected to measurement of tensile modulus by a tensile test at a test speed of 10 mm/min by use of an autograph (AG-IS, produced by Shimadzu Corporation).

TABLE 2

| | α-tocopherol [wt. %] | PDMS [wt. %] | Tensile modulus [N/mm²] | | | Hardness (A) | | |
|---|---|---|---|---|---|---|---|---|
| | | | Before irradiation | After irradiation | Difference | Before irradiation | After irradiation | Difference |
| Example 11 | 1.0 | 20.0 | 0.86 | 0.91 | +0.05 | 42 | 45 | +3 |
| Example 12 | 2.0 | 20.0 | 0.79 | 0.83 | +0.04 | 40 | 44 | +4 |
| Example 13 | 3.0 | 20.0 | 0.86 | 0.83 | −0.03 | 40 | 42 | +2 |
| Example 14 | 4.0 | 20.0 | 0.70 | 0.82 | +0.12 | 39 | 41 | +2 |
| Comparative Example 2 | — | 20.0 | 0.95 | 1.23 | +0.28 | 42 | 47 | +5 |
| Comparative Example 3 | 3.0 | — | 1.55 | 1.39 | −0.16 | 37 | 46 | +9 |
| Comparative Example 4 | — | — | 1.73 | 2.14 | +0.41 | 38 | 52 | +14 |

From Table 2, it was verified that the silicone rubber compositions obtained in Examples 11 to 14 by addition of α-tocopherol and PDMS to silicone rubber show effective restraining of a rise in hardness upon irradiation with electron beams, as compared to Comparative Examples 2 to 4 wherein addition of α-tocopherol or PDMS was omitted. Further, the results of Examples 11 to 14 showed that the restraining effect on the rise in hardness tends to be higher as the amount of α-tocopherol added is increased. Incidentally, the change in hardness by only addition of α-tocopherol and PDMS (the difference between the hardness (catalogue value) of the silicone rubber and the hardness of the silicone rubber composition before irradiation with electron beams) was slight.

Besides, it was also verified that the silicone rubber compositions obtained in Examples 11 to 14 by addition of α-tocopherol and PDMS to silicone rubber show a slighter change in tensile modulus upon irradiation with electron beams, as compared with Comparative Examples 2 to 4 wherein addition of α-tocopherol or PDMS was omitted.

<Production of Silicone Rubber Valve Body and Medical Device>

Example 15

Preparation A and Preparation B of a millable type silicone rubber (hardness A 50) (MED, produced by NuSil Technology LLC), each in an amount of 50 pats by weight, were preliminarily softened by kneading at room temperature. To 50 parts by weight of Preparation A, were added 1.0 part by weight (1.0 wt. % based on the whole weight of the silicone rubber (total weight of Preparation A and Preparation B)) of 3BHA (produced by Wako Pure Chemical Industries, Ltd.) and 20.0 parts by weight (20.0 wt. % based on the whole weight of the silicone rubber (total weight of Preparation A and Preparation B)) of polydimethylsiloxane (360 Medical Fluid, produced by Dow Corning Corporation; 100 cSt), and the resulting admixture was blended at 65° C. Thereafter, the blended mixture was once cooled to room temperature, then 50 parts by weight of Preparation was added thereto, and the resulting admixture was further blended.

The blended mixture thus obtained was formed into a sheet having a thickness of 1.3 mm, and the sheet was cured by heat treatment at 116° C. for 10 minutes, to prepare a silicone rubber composition. Thereafter, the composition was cut out into a circular shape with a diameter of 8.0 mm, and a slit of 4.5 mm in length and 0.88 mm in depth was formed to pass through the center of the circular sheet. On the other hand, the circular sheet is provided on the lower side with a slit which is equal to the upper-side slit in length and depth and which extends in such a direction as to form a cross together with the upper-side slit (in such a direction that the lower-side slit extends orthogonally relative to the upper-side slit), whereby a medical valve body was produced. Incidentally, each of the slits does not penetrate the circular sheet to the opposite side, and both the slits are intersecting each other inside the circular sheet; the length of the intersection being 0.46 mm. The valve body thus obtained was incorporated into an introducer (produced by Terumo Corporation), to obtain a medical device (introducer sheath). The introducer sheath was irradiated with 40 kGy of electron beams at room temperature by use of a 10 MeV electron accelerator, to obtain a sterilized medical device (introducer sheath).

Example 16

A silicone rubber composition was prepared by the same method as in Example 15, except that 3BHA was added in an amount of 2.0 parts by weight (2.0 wt. % based on the whole weight of the silicone rubber).

Example 17

A silicone rubber composition was prepared by the same method as in Example 15, except that 3BHA was added in an amount of 3.0 parts by weight (3.0 wt. % based on the whole weight of the silicone rubber).

Example 18

A silicone rubber composition was prepared by the same method as in Example 15, except that 3BHA was added in an amount of 4.0 parts by weight (4.0 wt. % based on the whole weight of the silicone rubber).

Comparative Example 5

A silicone rubber was prepared by the same method as in Example 15, except that addition of 3BHA was omitted.

<Evaluation of Performance>

[Hardness]

The valve bodies obtained in Examples 15 to 18 and Comparative Example 5 were subjected to measurement of hardness, according to JIS K 6253, before irradiation with electron beams and after the irradiation with electron beams (the irradiation was conducted by irradiation with 40 kGy of electron beams at room temperature by use of a 10 MeV electron accelerator). Incidentally, the measurement was carried out using an Asker rubber durometer Type A. The results are shown in Table 3.

[Dilator Piercing Resistance]

The sterilized introducer sheaths obtained in Examples 15 to 18 and Comparative Example 5 were evaluated as to piercing resistance at the time of insertion of a dilator into the introducer sheath, in comparison with the case of an EOG-sterilized (ethylene oxide gas-sterilized) introducer sheath. Incidentally, a dilator for 0.035 inch guide wire of a 6 Fr introducer produced by Terumo Corporation was used as the dilator. The results are shown in Table 3.

[Catheter Sliding Resistance]

A dilator was made to pierce through each of the sterilized introducer sheaths obtained in Examples 15 to 18 and Comparative Example 5, and the dilator was made to slide several times. Thereafter, catheter sliding resistance (at the time of insertion and at the time of pulling out) on each sterilized introducer sheaths was evaluated, in comparison with the case of an EOG-sterilized introducer sheath. Incidentally, a 5 Fr "Heartcath," produced by Terumo Corporation was used as the catheter. The sliding resistance was evaluated in the following four grades. The results are shown in Table 3.

[Leakage Test]

A dilator was made to pierce through each of the sterilized introducer sheath obtained in Examples 15 to 18 and Comparative Example 5, and the dilator was made to slide several times. Then, air was compressed, and each of the sterilized introducer sheaths was evaluated as to ease of leakage of air via the valve body part. Incidentally, the evaluation was conducted by measuring the leak generation angle observed when a guide wire is inserted and the guide wire is bent along the upper-side and lower-side slits in the valve body (number of tests being five). The results are shown in Table 3.

electron beams, as compared with the case of Comparative Example 5 wherein addition of 3BHA and PDMS was omitted. Besides, the results of Examples 15 to 18 show that the hardening-restraining effect is enhanced as the amount of 3BHA added is increased.

It was also verified that the valve bodies and introducer sheaths formed by use of the silicone rubber compositions obtained in Examples 15 to 18 retain their performances even when irradiated with electron beams. Especially, the products in Example 17 showing no change in hardness before and after the irradiation with electron beams was equivalent to or better than the EOG-sterilized product in dilator piercing resistance. In addition, the products in Examples 15 and 18 were equivalent to or better than the EOG-sterilized product when subjected to the leakage test.

On the other hand, the product in Comparative Example 5 showed an extremely high dilator piercing resistance, and showed a leak upon the leakage test. This is considered to be attributable to adhesion of the slits in the valve body, and hardening of the silicone in the vicinity of the slits, upon irradiation with electron beams.

The invention claimed is:

1. A valve body for a medical device to be sterilized with radiation, the valve body being made from a silicone rubber composition comprising a crosslinked polysiloxane silicone rubber, an antioxidant, and polydimethylsiloxane, the antioxidant and polydimethylsiloxane in amounts effective to restrain crosslinking of radicals generated during radiation sterilization;
   wherein the silicone rubber composition is an elastic composition that includes 0.1 to 5 percent of the antioxidant and about 1 to about 30 percent of the polydimethylsiloxane; and
   wherein the antioxidant includes tert-butylhydroxyanisole, vitamin E, derivatives of vitamin E or a salt of vitamin E or the derivatives.

TABLE 3

| | 3 BHA [wt. %] | PDMS [wt. %] | Method Of addition | Hardness (A) | | | Dilator piercing resistance | Catheter sliding resistance | | Leakage test |
| | | | | Before irradiation | After irradiation | Difference | | Inserting direction | Pulling-out direction | |
| --- | --- | --- | --- | --- | --- | --- | --- | --- | --- | --- |
| Example 15 | 1.0 | 20.0 | Mixing | 33 | 35 | +2 | Δ | ◉ | ○ | ◉ |
| Example 16 | 2.0 | 20.0 | | 33 | 34 | +1 | ○ | ◉ | ○ | Δ |
| Example 17 | 3.0 | 20.0 | | 31 | 31 | 0 | ◉ | ◉ | ○ | ○ |
| Example 18 | 4.0 | 20.0 | | 39 | 38 | −1 | ○ | ◉ | ○ | ◉ |
| Comparative Example 5 | — | — | — | 39 | 43 | +4 | X | ◉ | ○ | Δ |

<Evaluation of dilator piercing resistance and catheter sliding resistance>
◉ (Excellent): Equivalent to or better than EOG-sterilized product
○ (Good): Comparable to EOG-sterilized product
Δ (Acceptable): Worse than EOG-sterilized product but usable
X (Unacceptable): Worse than EOG-sterilized product
<Evaluation of results of leakage test>
◉ (Excellent): Equivalent to or better than EOG-sterilized product for all data
○ (Good): Equivalent to or better than EOG-sterilized product on average and showing no leak
Δ (Acceptable): Equivalent to or better than EOG-sterilized product on average and showing leak
X (Unacceptable): Worse than EOG-sterilized product for all data From Table 3, it was verified that the valve bodies formed by use of the silicone rubber compositions obtained in Examples 15 to 18 by admixing silicone rubber with 3BHA and PDMS show a slighter rise in hardness, or more effective restraining of a rise in hardness, upon irradiation with 2. The valve body of claim 1, wherein the antioxidant includes tert-butylhydroxyanisole selected from the group consisting of 2-tert-butyl-4-hydroxyanisole, 3-tert-butyl-4-hydroxyanisole, 2,6-di-tert-butyl-4-hydroxyanisole, 3,5-di-tert-butyl-4-hydroxyanisole, and mixtures thereof.

3. The valve body of claim 1, wherein the antioxidant includes vitamin E or its derivatives or a salt of vitamin E or its derivative.

4. The valve body of claim 1, wherein the crosslinked polysiloxane silicone rubber includes an alkenyl group-containing polyorganosiloxane crosslinked to an organohydrogenpolysiloxane.

5. The valve body of claim 4, wherein alkenyl group-containing polyorganosiloxane includes 0.001 to 1 mole percent of the alkenyl group based on 1 mole of the polyorganosiloxane.

6. The valve body of claim 4, wherein the organohydrogenpolysiloxane has at least two hydrogen atoms bonded to a silicon atom and contains 0.5 to 3 moles of silicon-bonded hydrogen per 1 mole of the alkenyl group in the alkenyl group-containing polyorganosiloxane.

7. A medical device incorporating as a component thereof a silicone rubber composition the silicone rubber composition being suitable for the medical device to be sterilized with radiation, the silicone rubber composition comprising a crosslinked polysiloxane silicone rubber, an antioxidant, and polydimethylsiloxane, the antioxidant and polydimethylsiloxane in amounts effective to restrain crosslinking of radicals generated during radiation sterilization, wherein the silicone rubber composition forms a valve body.

8. The medical device of claim 7, wherein the polydimethylsiloxane is 1 to 30 weight percent of the silicone rubber composition.

9. The medical device of claim 7, wherein the antioxidant includes tert-butylhydroxyanisole selected from the group consisting of 2-tert-butyl-4-hydroxyanisole, 3-tert-butyl-4-hydroxyanisole, 2,6-di -tert-butyl-4-hydroxyanisole, 3,5-di-tert-butyl-4-hydroxyanisole, and mixtures thereof.

10. The medical device of claim 7, wherein the antioxidant includes vitamin E or its derivatives or a salt of vitamin E or its derivative.

11. The medical device of claim 7, wherein the silicone rubber composition includes 0.1 to 10 percent of the antioxidant and about 1 to about 30 percent of the polydimethylsiloxane.

12. The medical device of claim 7, wherein the crosslinked polysiloxane silicone rubber includes an alkenyl group-containing polyorganosiloxane crosslinked to an organohydrogenpolysiloxane.

13. The medical device of claim 12, wherein alkenyl group-containing polyorganosiloxane includes 0.001 to 1 mole percent of the alkenyl group based on 1 mole of the polyorganosiloxane.

14. The medical device of claim 12, wherein the organohydrogenpolysiloxane has at least two hydrogen atoms bonded to a silicon atom and contains 0.5 to 3 moles of silicon-bonded hydrogen per 1 mole of the alkenyl group in the alkenyl group-containing polyorganosiloxane.

* * * * *